No. 808,811. PATENTED JAN. 2, 1906.
J. W. BROWN.
AUTOMATIC PRESSURE RETAINER.
APPLICATION FILED AUG. 27, 1904.
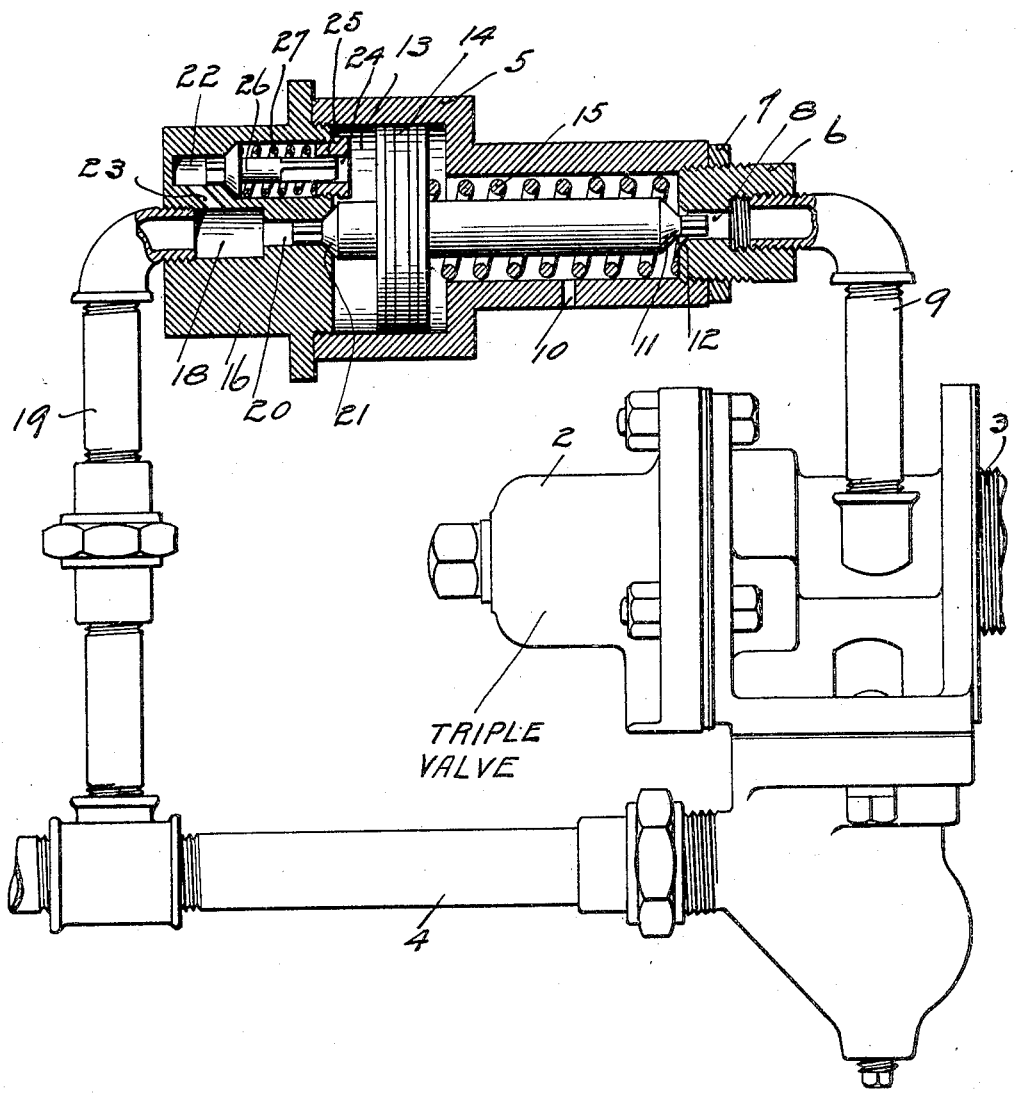
WITNESSES
INVENTOR
JAMES W. BROWN
BY
HIS ATTORNEYS

UNITED STATES PATENT OFFICE.

JAMES W. BROWN, OF MINNEAPOLIS, MINNESOTA.

AUTOMATIC PRESSURE-RETAINER.

No. 808,811.   Specification of Letters Patent.   Patented Jan. 2, 1906.

Application filed August 27, 1904. Serial No. 222,386.

*To all whom it may concern:*

Be it known that I, JAMES W. BROWN, of Minneapolis, Hennepin county, Minnesota, have invented certain new and useful Improvements in Automatic Pressure-Retainers, of which the following is a specification.

My invention relates to automatic pressure-retainers designed especially for use in connection with air-brakes for holding trains on steep grades.

The object of my invention is to provide means for giving the engineer absolute control over all retaining-valves on the train at all times.

A further object is to provide a retaining device which can be applied to an ordinary air-brake system without making any change in the equipment.

The invention consists generally in a retainer connected with the triple-valve exhaust and with the train-pipe and having a valve arranged to close the exhaust when the pressure in the train-pipe is carried above a certain predetermined point and to allow successive reductions of the pressure in the train-pipe to obtain the desired braking pressure until it drops below a certain predetermined point.

Further, the invention consists in various constructions and combinations, all as hereinafter described, and particularly pointed out in the claims.

In the accompanying drawing, forming part of this specification, the figure represents an air-brake-system triple valve, showing the retainer in longitudinal section connected with the exhaust of the valve and with a branch from the train-pipe.

In the drawing, 2 represents a triple valve of ordinary construction connecting at 3 with a brake-cylinder and the auxiliary reservoir. (Not shown.)

4 is a branch pipe leading from the triple valve to the train service-pipe, which I have not thought necessary to illustrate in this case, all parts of the apparatus except the retainer being of the ordinary construction in general use in air-brake systems.

5 is the casing of the retainer. It is provided at one end with a threaded plug 6, fitting into the end of the casing and provided with a lock-nut 7, by means of which the plug can be easily adjusted and the tension of the exhaust-port valve regulated.

8 is a port or passage leading through the plug 6 and connected by a pipe 9 with the exhaust of the triple valve.

A port 10 is provided in the wall of the casing, through which the triple valve is allowed to exhaust when the passage 8 is open. A valve 11 is provided within the casing 5 and adapted to close the passage 8, having a tapered surface to fit a corresponding surface or seat 12 at the inner end of said passage. A cylinder 13 is provided in one end of the casing 5, and the stem of the valve 11 has a piston 14 within said cylinder. A coil-spring 15 is arranged on said stem, bearing at one end on the plug 6 and at the other on the piston 14 and normally holding the valve 11 away from its seat and the exhaust-port opening. The end of the cylinder 13 is closed by a plug 16 and provided with a chamber 18, that communicates with the pipe 4 through a pipe 19. A passage 20 leads from the chamber 18 to the cylinder 13, and this passage is normally closed by a valve 21 on the opposite side of the piston 14 from the valve first described and forming substantially a continuation of the stem thereof. The coil-spring 15 is preferably adapted to hold the valve 21 to its seat until the pressure in the cylinder 13 exceeds thirty pounds, when the valve leading to the exhaust will be closed and remain so until the pressure in the cylinder is reduced sufficiently to allow the spring 15 to return the valves to their normal position. The plug 16 is also provided with a chamber 22, communicating with chamber 18 through a port 23 and also with the cylinder through a passage 24 in a threaded plug 25. A valve 26 in said chamber normally prevents the passage of air therethrough into the cylinder and is held in its closed position by spring 27, coiled about the stem of the valve between it and the plug 25, the latter being adjustable to allow the tension of the spring to be regulated as desired. I prefer to provide a spring that will hold the valve to its seat up to a pressure of eighty-five pounds, or, in other words, prevent the entrance of air into the cylinder 13 until the pressure in the train-pipe has been raised above eighty-five pounds, at which time the spring 27 will yield, allowing the valve to open and the air to flow into the cylinder. In constructing the device the area of the valves 21 and 26 is computed in the proper ratio to prevent any possibility of the former opening under the pressure that is too low to affect the latter.

The operation of the device is as follows: The retainer is placed under the car above and near the triple valve and connected with the exhaust thereof and with the train-pipe in the manner described. The spring 15 is arranged to exert, for instance, a pressure equal to thirty pounds per square inch on the piston 14, closing the valve 21 and opening the passage to the exhaust. Spring 27 exerts a pressure equal to eighty-five pounds per square inch on the valve 26. The pressure in the chambers 18 and 22 will be the same as that in the train service-pipe, which is usually seventy pounds, the standard train-pipe pressure. This pressure is not, however, sufficient to unseat the valve 26, and consequently the retainer will remain inoperative and the brake system can be used in the ordinary way for operating brakes on level or on low grades. If the engineer desires to use the retainer, he will place the brake-valve in full-release position and charge the train-pipe to ninety pounds pressure. This will unseat the valve 26 and allow air to pass into the cylinder 13 and operate the piston 14 against the tension of the spring 15 and close the valve 11, shutting off the exhaust-passage from the triple valve and establishing a direct communication between the train-pipe and the cylinder 13. The valve 11 will remain in position to close the exhaust until such time as the pressure in the train-pioe is reduced below thirty pounds, or the power that the spring 15 exerts on the valve 21. The engineer can now set the brakes by reducing the train-pipe pressure to the ordinary braking pressure of fifty pounds, and the retaining-valve will still remain in position to close the exhaust, the pressure in the cylinder 13 exceeding the power of the spring 15 by twenty pounds. As soon as the brakes are fully applied the engineer will place his brake-valve in running position, and thus recharge his train-pipe, and although in making such recharge the triple valve will be moved to release no exhaust will take place, as the retainer will effectually close the exhaust-passage and the air in the brake-cylinder cannot escape, being trapped in, as it were. As the air in the brake-cylinder gradually leaks away and the pressure is reduced as the train is running down a heavy grade the speed will gradually increase and it becomes desirable to reset the brakes. The engineer therefore makes a second reduction in train-pipe pressure, five or ten pounds being sufficient to again give full braking power, owing to the air that is already confined in the brake-cylinder. The brake-valve is then placed in running position again. This operation can be repeated as often as desired, and when near the bottom of the grade the brake-valve is placed on "lap" instead of in running position, and when the train nearly reaches the bottom of the grade the pressure in the train-pipe should be reduced below thirty pounds, or the power of the spring 15, whereupon the piston will be moved, the valve 21 closed, and the passage to the exhaust opened, and upon charging the train-pipe to normal or seventy-pounds pressure again the triple valve will operate to allow the air in the brake-cylinder to escape, and the retainer will then be out of service and remain so until the pressure in the train-pipe is again raised sufficiently to overcome the power of the spring that controls the passage of air into the retainer-cylinder.

I claim as my invention—

1. A pressure-retainer comprising a casing connected with the exhaust of a triple valve and with the train service-pipe, and having a valve operating to close said exhaust when the pressure in the train-pipe is raised above a certain predetermined point preparatory to reducing the train-pipe pressure to set the brakes, and to remain in such position and allow successive reductions of train-pipe pressure without opening the exhaust, until the pressure in the train-pipe is reduced to a certain predetermined point below normal braking pressure.

2. In an air-brake system, the combination, with a triple valve and the train service-pipe, of a casing connected with the exhaust of said valve and with the train-pipe, a spring-actuated valve provided in said casing and normally closing the passage to said train-pipe and opening the passage to the exhaust, a cylinder having its piston connected with said valve and a second valve operating at a higher pressure than said first-named valve, and normally closing a passage leading from said train-pipe to said cylinder.

3. The combination, with a train service-pipe, and a triple valve, of a retainer-casing connected with the exhaust of said valve and with said pipe, and provided with a cylinder and piston arranged in said cylinder and having valves on its opposite sides arranged to close respectively the passages to the exhaust and to said train-pipe, a spring arranged to normally hold the train-pipe valve in its closed position and open the passage to the exhaust, until the pressure on said piston exceeds a predetermined number of pounds, said casing being provided with a passage leading from said train-pipe to said cylinder around said train-pipe valve, and a valve provided in said passage and having a spring that normally holds said passage-valve in its closed position, but is adapted to yield and open the passage to said cylinder when the pressure in the train-pipe exceeds a predetermined number of pounds, substantially as described.

4. The combination, with a triple valve and the train service-pipe, of means operating to close the exhaust of said valve when the pressure in the train-pipe is raised above a certain predetermined point preparatory to reducing the train-pipe pressure to set the brakes and allow successive reductions of train-pipe pressure without opening the exhaust until the pressure in the train-pipe is reduced to a certain predetermined point below normal braking pressure.

In witness whereof I hereunto set my hand this 23d day of August, 1904.

JAMES W. BROWN.

In presence of—
  RICHARD PAUL,
  C. MACNAMARA.